Figure 1:
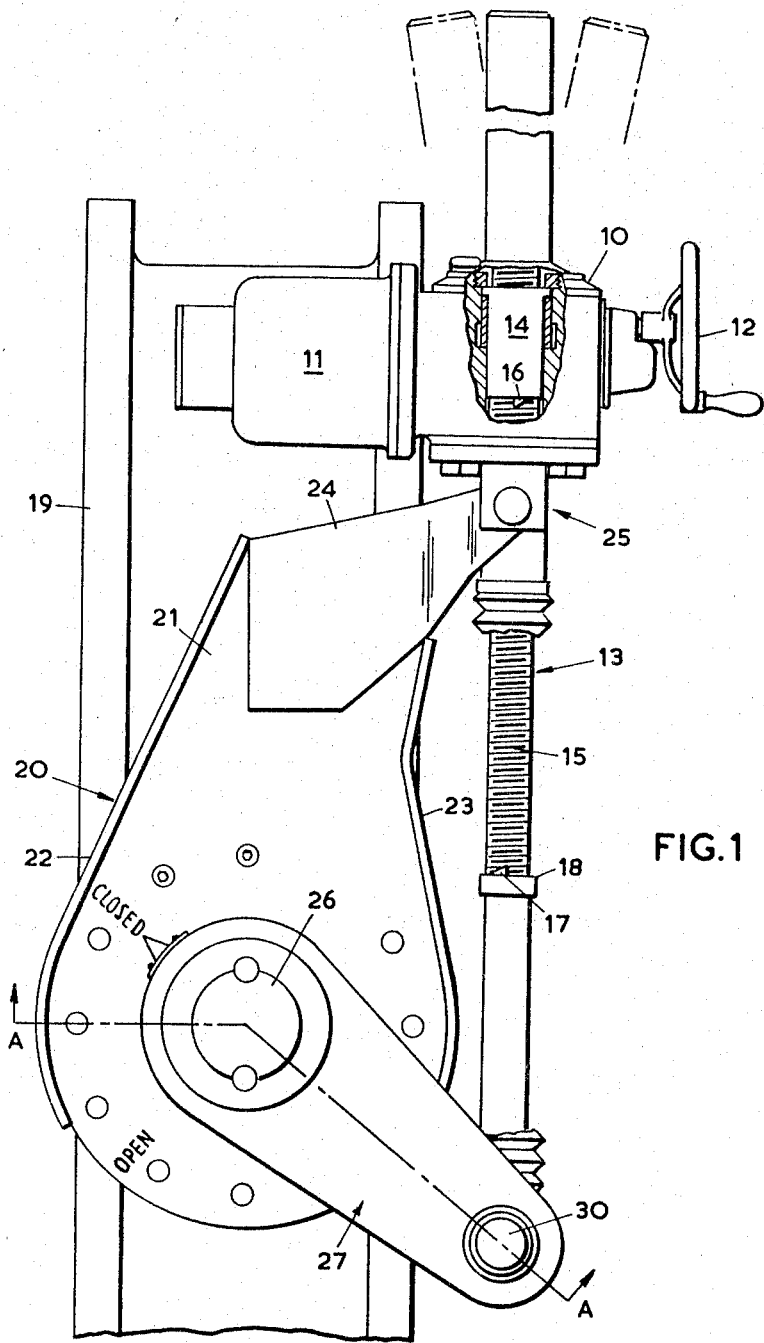

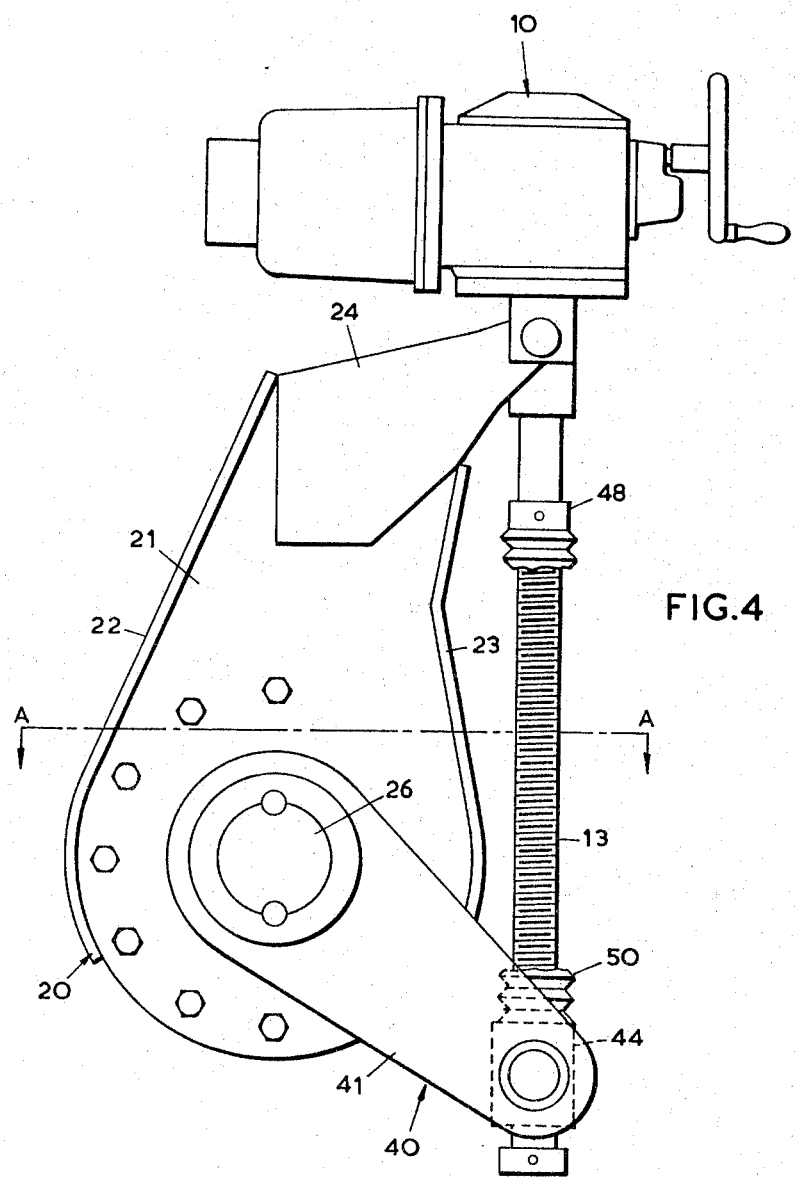

United States Patent Office 3,318,171
Patented May 9, 1967

3,318,171
ACTUATORS
Harry Wilkinson and Desmond Ernest Hutchinson, Bradford, England, assignors to The English Electric Company Limited, London, England, a British company
Filed May 22, 1964, Ser. No. 369,542
Claims priority, application Great Britain, May 31, 1963, 21,916/63
7 Claims. (Cl. 74—625)

This invention relates to actuators of the type which provide a very high torque at low speed.

Such actuators are, for example, used for operating the spindles of large butterfly valves or for boiler dampers where they may be required to provide, for example, a torque of 30,000 lbs. ft.

According to one aspect of the invention an actuator is mounted on a plate-like support structure fixed to the casing of a member to be moved by the actuator, the actuator having an operating shaft coupled to an operating spindle of the said member and disposed substantially in line with an edge of the plate-like support structure and arranged such that the line of thrust of the actuator shaft is substantially on the longitudinal centre line of the said edge of the plate-like support structure.

The plate-like support structure may be fixed to the casing closely adjacent thereto with the operating spindle coupled to the operating shaft by an arm disposed on one side of the support structure.

Alternatively, the plate-like support structure may be fixed to the casing in spaced relationship thereto with the operating spindle coupled to the operating shaft by an arm having parts thereof disposed on bothe sides of the plate-like support structure.

Preferably, the actuator is pivotally mounted on a stirrup secured to the plate-like support structure.

The plate-like support structure may include transverse stiffening ribs.

According to another aspect of the invention the actuator is mounted on a structure fixed to the casing of a valve having a valve member to be operated by the actuator.

One form of actuator in accordance with the invention will now be described, by way of example, with reference to the accompanying drawings which show the actuator arranged to operate a large butterfly valve.

Figure 2:
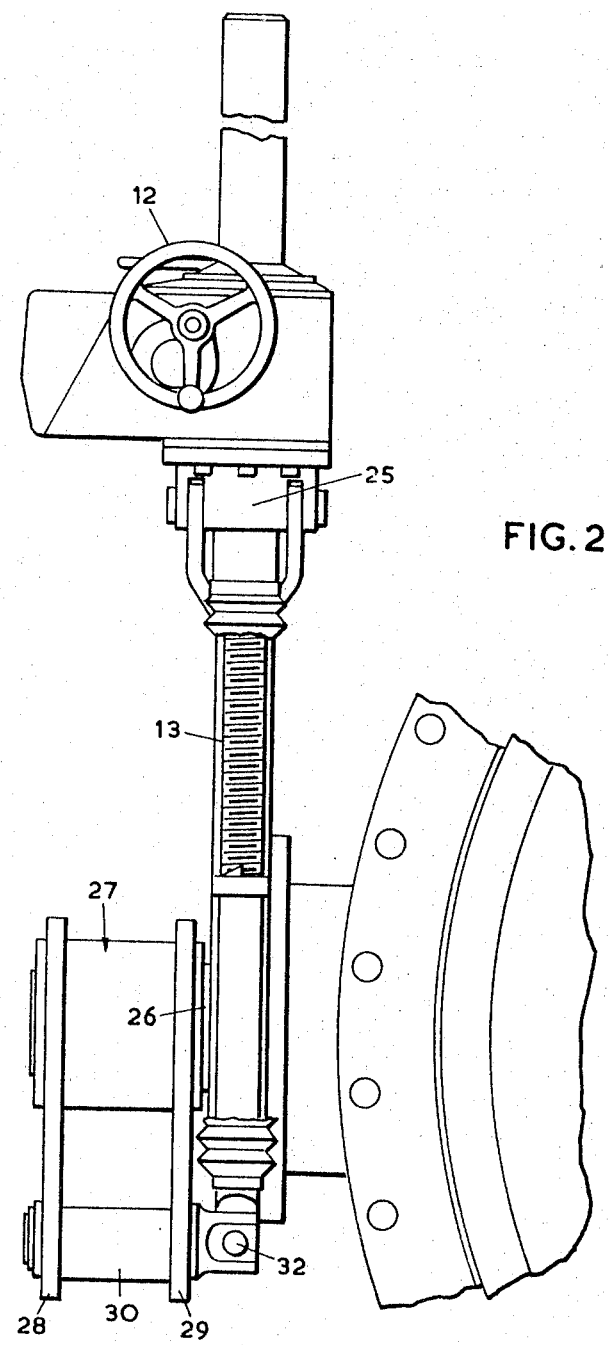
Figure 3:
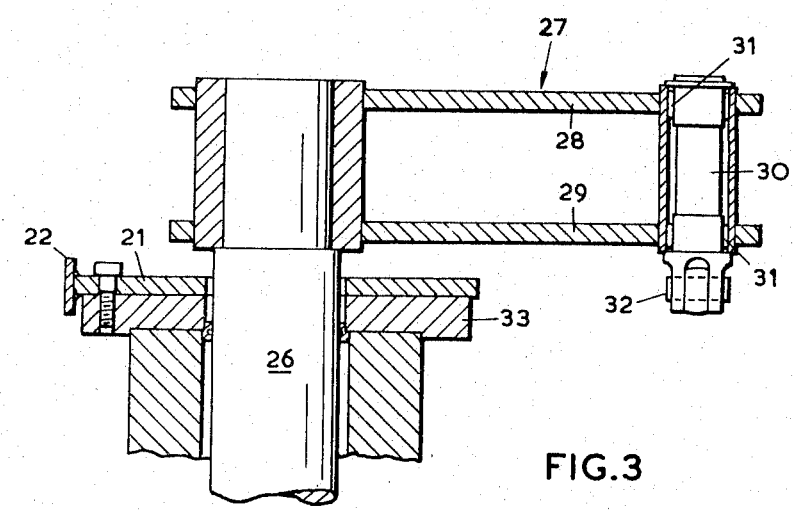
Figure 5:
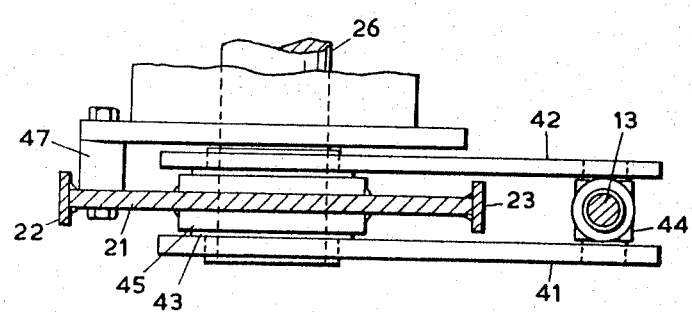

In the drawings:

FIG. 1 is a side view of the actuator mounted on the valve casing, only part of which is shown, FIG. 2 is a front view of the actuator and valve arrangement shown in FIG. 1, FIG. 3 is a section through part of the valve arm and spindle taken on the line A—A of FIG. 1, and FIGS. 4 and 5 show two modifications of the arrangement shown in FIGS. 1 to 3, FIG. 4 being a side view of the modified arrangement and FIG. 5 being a section through FIG. 4 on the line A—A thereof.

In FIG. 1 there is shown an actuator generally indicated at 10 having a driving motor 11 and a handle 12 for hand operation of the actuator which has a threaded shaft 13 running in a ball screw arrangement comprising a ball screw nut 14 and co-operating thread 15 on the shaft. The nut 14 is provided with a buttress stop 16 which can co-operate with a similar buttress stop 17 on a collar 18 on the shaft 13 to prevent overrunning of the actuator should the normal actuator switches fail.

Part of the valve casing is shown at 19 in FIG. 1 and this carries a plate-like support bracket 20 having a flat plate-like portion 21 with flanged strengthening edge portions 22 and 23. A stirrup 24 fixed to the support bracket 20 is arranged pivotally to carry the actuator as shown at 25 in FIGS. 1 and 2.

The valve spindle is shown at 26 and carries a heavy box section operating arm generaly indicated at 27.

As may be seen from FIG. 3, the operating arm 27 secured to the spindle 26 comprises a pair of spaced co-operating arms 28 and 29 which at their extreme end support a rotatably mounted spindle 30 mounted in needle rollers shown at 31 in FIG. 3. The spindle 30 carries at one end thereof a crank pin 32 which projects beyond the arm for coupling to the end of the actuator arm 27 as can best be seen in FIG. 2.

Referring to FIG. 3 the spindle 26 of the valve can be seen to emerge from the valve casing through a flange 33 to which is secured the flat portion 21 of the bracket 20 and the centre line of the crank pin 32 is disposed substantially in line with the centre line of the edge of the plate portion 21.

Referring to FIGS. 2 and 3 it will be seen that movement of the shaft 13 will be substantially in line with the centre line of the plate portion 21 of the bracket 20 and by this means the spindle torque is applied in the same plane as the mounting bracket 20 substantially at the point at which the valve spindle 26 emerges from the valve housing.

The arrangement shown in FIGS. 4 and 5 is generally similar to that shown in FIG. 1 in that the actuator is pivotally mounted in a stirrup 24 attached to a support bracket 20 with the actuator shaft 13 coupled to the valve spindle 26 by an operating arm. In this embodiment, however, the operating arm generally shown at 40 consists of a pair of plates 41, 42 secured to a central hub 43 with a ball screw nut 44 mounted between the arms 41 and 42 and carried in trunnions so as to be pivotally movable in the arm. The threaded shaft 13 is driven directly by the actuator and operates through the ball screw nut on the end of the operating arm.

In addition the support bracket 20 is mounted on the valve casing with spacing members 47 therebetween so that one of the arms 41 and 42 is disposed on one side of the support bracket 20 and the other arm disposed on the other side thereof. The support bracket is also provided with an additional circular strengthening rib 45.

In a further modification of the invention the buttress stops are omitted and a stack of Belleville washers used in their place. For example, in FIG. 4 a stack of Belleville washers 50 is shown arranged over the shaft 13 between the ball screw nut 44 and a collar 48 on the shaft, so as to act as a spring buffer stop.

What we claim as our invention and desire to secure by Letters Patent, is:

1. In or for a spindle-operated device having a high-torque operator mechanism for controlling the spindle, the said device including a housing out of which the said spindle projects, a high-torque operator mechanism comprising a torque arm mounted on the spindle and projecting radially from the spindle, a rigid flat plate secured to the said housing in the vicinity of the spindle and lying in a plane normal to the spindle axis, and a power unit having a casing pivoted to the plate by a pivot pin lying parallel to the spindle, and an operating shaft extending from the casing and lying with its axis in the plane of the plate for applying an axial thrust reacted through the pivot pin with a non-torsional shear force on the plate, the free end of the operating shaft being pivotally connected to the free end of the torque arm for transmitting a torque to the spindle through the said arm.

2. In or for a spindle-operated device having a high-torque operator mechanism for controlling the spindle, the said device including a housing out of which the said spindle projects, a high-torque operator mechanism comprising a torque arm mounted on the spindle and projecting radially from the spindle, a rigid flat plate secured to the said housing in the vicinity of the spindle and lying in a plane normal to the spindle axis, and a motor-powered actuator unit including a casing pivoted to the plate by a pivot pin lying parallel to the spindle, and an operating shaft extending from the casing, with its axis in the plane of the plate, and pivotally connected at its free end to the free end of the torque arm, the said shaft serving as the screw portion of a screw and nut mechanism by which the shaft transmits to the torque arm an axial thrust which is reacted through the pivot pin with a non-torsional shear force on the plate.

3. A high-torque operator mechanism according to claim 2 in which the motor-powered actuating unit includes an electric motor mounted on the casing of the unit for operating the unit under electric power, and a hand wheel for manual operation of the unit.

4. In or for a spindle-operated device having a high-torque operator mechanism for controlling the spindle, the said device including a housing out of which the said spindle projects, a high-torque operator mechanism comprising a torque arm mounted on the spindle and projecting radially from the spindle, the said torque arm being formed by two laterally spaced side plates, a rigid flat mounting plate secured to the said housing in the vicinity of the spindle and lying in a plane normal to the spindle axis, which plane lies between the side plates of the torque arm, and a motor-powered actuator unit including a casing pivoted to the mounting plate by a pivot pin lying parallel to the spindle, and a rotatable output shaft having an external screw thread engaging in an internally screw-threaded nut pivoted between the side plates of the torque arm at the free end of the arm, the said output shaft having its axis in the plane of the mounting plate whereby the axial thrust applied by the shaft to the nut is reacted back to the mounting plate, via the pivot pin, as a non-torsional shear force on the mounting plate.

5. A high-torque operator mechanism according to claim 4 including a stack of Belleville washers around the screw-threaded output shaft of the actuator unit serving as a spring buffer in the event of excessive movement of the nut towards the casing of the actuator unit.

6. A high-torque operator mechanism according to claim 4 in which the motor-powered actuating unit includes an electric motor mounted on the casing of the unit for operating the unit under electric power, and a hand wheel for manual operation of the unit.

7. In or for a spindle-operated device having a high-torque operator mechanism for controlling the spindle, the said device including a housing out of which the said spindle projects, a high-torque operator mechanism comprising a torque arm mounted on the spindle and projecting radially, from the spindle, a rigid flat plate secured to the said housing in the vicinity of the spindle and lying in a plane normal to the spindle axis and extending approximately laterally with respect to the torque-arm, stirrup means connected to the plate at an end of the plate remote from the spindle and projecting approximately lateral from the plate in the same sense as the torque arm, and a power unit having a casing pivotally connected to the stirrup means by a pivot pin lying parallel to the spindle, and an operating shaft extending from the casing and lying with its axis in the plane of the plate for applying an axial thrust reacted through the pivot pin with a non-torsional shear force on the plate, the free end of the operating shaft being pivotally connected to the free end of the torque arm for transmitting a torque to the spindle through the said arm.

References Cited by the Examiner

UNITED STATES PATENTS

| | | | |
|---|---|---|---|
| 2,704,947 | 3/1955 | Hopkins | 251—228 X |
| 2,833,511 | 5/1958 | Fletcher | 251—298 X |
| 2,930,252 | 3/1960 | Sears et al. | 251—228 X |
| 3,011,359 | 12/1961 | Morrell | 251—228 X |
| 3,053,499 | 9/1962 | Jones | 251—284 |
| 3,113,589 | 12/1963 | Carr et al. | 251—130 X |
| 3,223,380 | 12/1965 | Hochmuth et al. | 251—204 |

M. CARY NELSON, *Primary Examiner.*

S. SCOTT, *Assistant Examiner.*